Nov. 12, 1935.  G. MAIURI  2,021,073
PRODUCTION OF SOLID CARBON DIOXIDE
Filed June 20, 1933  2 Sheets-Sheet 1

INVENTOR
GUIDO MAIURI
by Francis E. Boyce
ATTORNEY

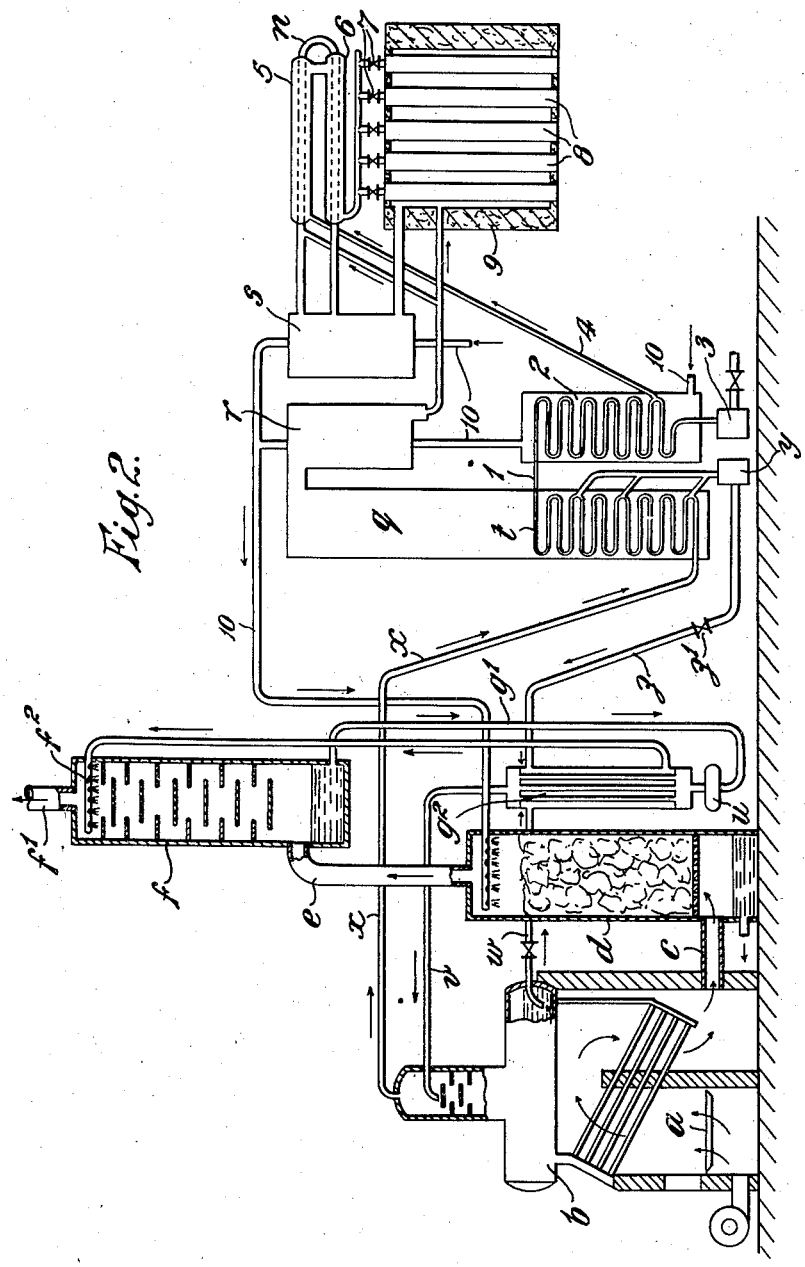

Patented Nov. 12, 1935

2,021,073

UNITED STATES PATENT OFFICE 2,021,073

PRODUCTION OF SOLID CARBON DIOXIDE

Guido Maiuri, Torino, Italy, assignor to Maiuri Refrigeration Patents Limited, Aldwych, London, England Application June 20, 1933, Serial No. 676,623
In Great Britain June 30, 1932

5 Claims. (Cl. 62—121)

This invention relates to the production of solid carbon dioxide or carbon dioxide snow.

Carbon dioxide gas can be produced by various methods, amongst which is by the combustion of coke in an excess of air, the air being in excess to avoid the ultimate presence of carbon monoxide. The products of such combustion consist of carbon dioxide and nitrogen, together with a small quantity of oxygen due to the air being in excess. The carbon dioxide is separated by being absorbed in a soda solution, from which it is driven off by heat.

To obtain solid carbon dioxide, usually gaseous carbon dioxide is compressed in a multistage compressor and by the expansion of part of the compressed carbon dioxide, the remainder is eventually frozen into the solid condition as carbon dioxide snow.

The object of the present invention is to enable solid carbon dioxide to be produced from carbon dioxide gas, of whatever origin, without the employment of a multistage compressor, which is an expensive machine, and with a lesser expenditure of energy than with a multistage compressor.

For the above purpose, according to the invention, in the production of solid carbon dioxide the latent heat of vaporization of the carbon dioxide is removed from the carbon dioxide in an absorption refrigerating machine.

The use of an absorption refrigerating machine for the above purpose has advantages over other types of refrigerating machines in respect of size and economy of working.

Preferably, the carbon dioxide is maintained above its triple point pressure in the absorption refrigerating machine so that it passes through the liquid state before solidifying inside or outside the machine. This avoids the deposit of carbon dioxide snow within the machine and the accompanying troublesome removal of such snow. The triple point of carbon dioxide, (viz. the temperature and pressure at which it can co-exist in the gaseous, liquid and solid state in thermodynamic equilibrium) is $-56.6°$ C. at 5.28 kilogrammes per square centimetre.

The carbon dioxide can be maintained above its triple point either in respect of both pressure and temperature or in respect of pressure only.

For example, the carbon dioxide gas can be compressed in a single stage compressor to 6 kilogrammes per square centimetre (6 atmospheres absolute) and cooled in an absorption refrigerating machine to about $-53°$ C. whereby the carbon dioxide is liquefied. The liquefied carbon dioxide at $-53°$ C. is then allowed to pass to a region at atmospheric pressure, whereupon part thereof evaporates and expands, and the temperature decreases to $-78.9°$ C., which is the freezing point of carbon dioxide at atmospheric pressure. At this temperature of $-78.9°$ C., about 58% of the carbon dioxide solidifies as carbon dioxide snow, with a loss of 42% which has evaporated to the gaseous state.

The carbon dioxide snow can, in the known manner, be consolidated into carbon dioxide ice by mechanical pressure.

Alternatively, carbon dioxide gas compressed to 4 atmospheres absolute is cooled in an absorption refrigerating machine to about $-60°$ C. At this pressure the carbon dioxide freezes into snow without passage through the liquid state. On allowing the snow at $-60°$ C. and 4 atmospheres to pass to a region at atmospheric pressure, some evaporates and expands and the resulting expansion reduces the temperature to $-78.9°$ C. and all but about 5% of the carbon dioxide remains as carbon dioxide snow.

In a further alternative, with a refrigerating machine giving a temperature of $-60°$ C., carbon dioxide compressed to 6 atmospheres can be cooled to about $-53°$ C., the liquefaction point at 6 atmospheres, and passed in the gaseous state at said pressure into moulds, cooled by the refrigerating machine at $-60°$ C. In these cooled moulds the carbon dioxide freezes into ice passing for a short time through the liquid state and forming solid blocks of high density.

Instead of compressing the carbon dioxide gas in a mechanical compressor, it can be maintained at the required pressure, for instance slightly above the triple point pressure, by pressure generated in a boiler, as hereinafter described.

Not only do the above methods of producing solid carbon dioxide avoid the use of expensive compressors and the incidental large expenditure of mechanical energy, but also the heat required for operating the absorption refrigerating machines and for driving the carbon dioxide gas out of the soda solution, can be obtained from the combustion of coke to produce the carbon dioxide gas. Likewise the heat can be used to generate steam for a steam engine driving the single stage compressor.

It has been estimated that whereas by three-stage compression it is necessary in compressing 263 kilogrammes per hour of $CO_2$ gas to obtain 38% or 100 kilogrammes of carbon dioxide snow to expend 40 H. P., with the first method according to the invention 100 kilogrammes of snow per hour can be obtained by compressing 175 kilogrammes of gas to 6 atmospheres yielding 57% of snow with an expenditure of 10.5 H. P. With the second method 100 kilogrammes of snow per hour are obtained with an expenditure of 4.5 H. P., 95% of the gas treated being converted into snow.

Expanded carbon dioxide gas at −78.9° C. is obviously returned to the compressor, after having in the heat exchanger extracted heat from carbon dioxide gas at 6 or 4 atmospheres, as the case may be, going to the evaporator of the refrigerating machine.

Plants for carrying out the invention are diagrammatically illustrated by way of example on the accompanying drawings, in which:—

Fig. 2 is a diagrammatic sectional elevation of a plant for making carbon dioxide ice with an absorption refrigerating machine and in which boiler pressure is employed to maintain the carbon dioxide under pressure.

Figure 1:
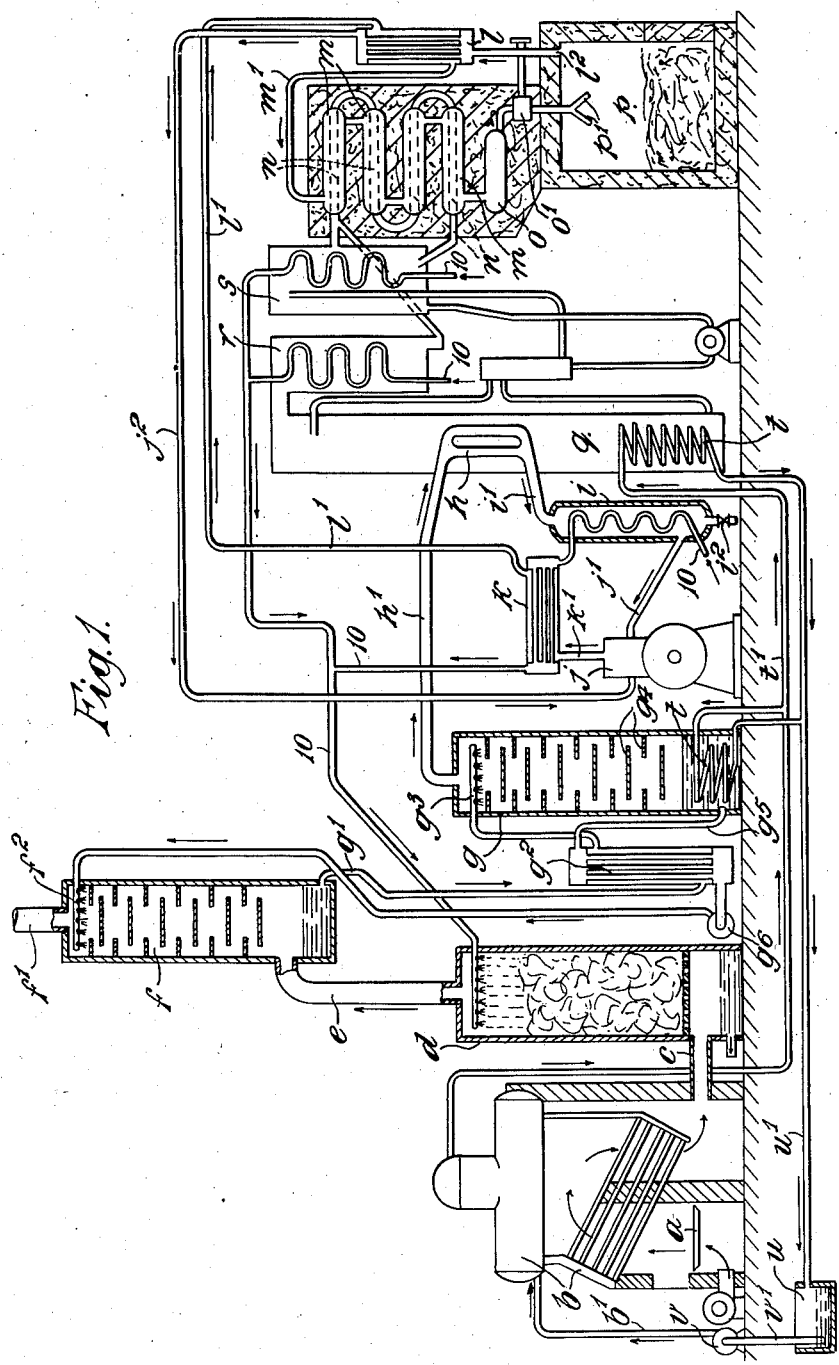
Fig. 1 is a diagrammatic sectional elevation of a plant for making carbon dioxide snow with a one-stage compressor and an absorption refrigerating machine.

Referring to Fig. 1, $a$ is the furnace of a boiler $b$. The products of the combustion of coke in the furnace $a$ pass, by a pipe $c$, into a scrubber $d$, wherein the water and other condensible constituents of the products of combustion are condensed, and the gases are freed from dust and other mechanical impurities. From the scrubber $d$ the carbon dioxide and nitrogen constituents of the products of combustion unabsorbed by the water in the scrubber, pass by a pipe $e$ into an absorption column $f$ wherein the carbon dioxide is absorbed by a descending shower of soda solution. The nitrogen escapes through a chimney pipe $f^1$.

The soda solution with the carbon dioxide dissolved therein flows down a pipe $g^1$, through a heat exchanger $g^2$ to a sprinkler $g^3$ at the top of a heated chamber $g$ containing baffles $g^4$.

The soda solution is drawn-off from the bottom of the separating chamber $g$ through a pipe $g^5$ by a pump $g^6$, passing thereto through the heat exchanger $g^2$. The pump $g^6$ delivers the soda solution to a sprinkler $f^2$ at the top of the absorption column $f$.

The carbon dioxide is driven-off from the soda solution by the heat in the chamber $g$ and, together with water vapour, passes by a pipe $h^1$ to a heat exchanger $h$ and thence by a pipe $i^1$ to a water-cooled cooler $i$. The water condensed in the cooler $i$ passes out by a water trap $i^2$.

From the cooler $i$ the carbon dioxide passes through a pipe $j^1$ to a single stage compressor $j$ wherein it is compressed to 6 atmospheres absolute.

The compressed carbon dioxide gas passes from the compressor $j$ by a pipe $k^1$ to a water-cooled cooler $k$, from which it passes by a pipe $l^1$ to a heat exchanger $l$, through which expanded carbon dioxide gas also passes, as described later.

From the heat exchanger $l$ the compressed carbon dioxide gas passes by a pipe $m^1$ into the refrigerating chamber $m$ of an absorption refrigerating machine.

The refrigerating chamber $m$ is indicated as jacketing the evaporator coil $n$ of the refrigerating machine.

The compressed carbon dioxide gas is liquefied by the temperature of about −53° C. in the refrigerating chamber $m$ and collects in a chamber $o$. The liquid carbon dioxide is released from the chamber $o$ by a cock $o^1$ and escapes by a nozzle $p^1$ into a chamber $p$, which is at atmospheric pressure.

Being at atmospheric pressure, part of the escaping liquid carbon dioxide evaporates and expands and produces the temperature of −78.9° C. whereby a portion of the carbon dioxide freezes as carbon dioxide snow in the chamber $p$. Snow is formed instead of ice as the freezing particles of liquid are all separated by expanding gas.

The carbon dioxide snow can be mechanically compacted into dense solid carbon dioxide.

The residue of the expanded very cold carbon dioxide gas passes from the chamber $p$ by a pipe $l^2$ to the above-mentioned heat exchanger $l$, wherein it cools the compressed carbon dioxide gas proceeding to the refrigerating chamber $m$.

From the heat exchanger $l$ the carbon dioxide gas passes by a pipe $j^2$ back to the compressor $j$, therein to become again compressed together with fresh carbon dioxide gas arriving by the pipe $j^1$.

$q$ is the generator of the absorption refrigerating machine, of which $n$ is the already mentioned evaporator, $r$ is the condenser and $s$ is the absorber of this absorption refrigerating machine.

The above-mentioned heat exchanger $h$ is located in a portion of the generator $q$ of the absorption refrigerating machine, wherein latent heat of condensation of the water vapour arriving by the pipe $h^1$ is utilized.

The already mentioned boiler $b$ which is heated by the furnace $a$ which generates the carbon dioxide gas, is utilized to produce steam at say 2 kilogrammes per square centimetre, (2 atmospheres absolute). This steam is supplied by piping $t^1$ to heating coils $t$ located in the separator $g$ and in the generator $q$ of the absorption refrigerating machine. Condensed water from the coils $t$ flows by piping $u^1$ to a sump $u$, from which it is raised up a pipe $v^1$ by a pump $v$, which delivers it by a pipe $b^1$ back to the boiler $b$.

Steam from the boiler $b$ if produced in sufficient quantity and at a sufficient pressure can also be supplied to a steam engine for driving the compressor $j$. If in such case an excess of carbon dioxide is produced in the furnace $a$, such excess will be rejected by the soda solution in the column $f$ becoming saturated, and will escape by the chimney pipe $f^1$.

The plant illustrated in Fig. 2, differs from that of Fig. 1, mainly in that the pressure above the triple point of the carbon dioxide is maintained by pressure generated in the boiler $b$, and that the carbon dioxide is cooled to the liquid state and sets as ice in moulds in the absorption refrigerating machine. Thus in the plant illustrated in Fig. 2, the soda solution which has absorbed carbon dioxide in the absorption column $f$, is forced by a pump $u$ through the heat exchanger $g^2$ and through a pipe $v$ to the boiler $b$, wherein the carbon dioxide is driven off from the soda solution and a pressure of 6 atmospheres absolute is maintained. The soda solution returns from the boiler $b$ along a pipe $w$ to the heat exchanger $g^2$, from which it is delivered back to the sprinkler $f^2$ in the absorption column $f$.

Carbon dioxide gas and steam at 6 atmospheres absolute pass by a pipe $x$ to the heating coil $t$ of the generator $q$ of the absorption refrigerating machine. In the coil $t$ almost all the steam is condensed and its latent heat utilized to heat the generator $q$. The water of condensation in the coil $t$ flows into a collector $y$ from which it passes along a pipe $z$, having a regulating cock $z^1$, to the heat exchanger $g^2$, where it mixes with soda solution proceeding from the boiler $b$ to the sprinkler $f^2$ of the absorption column $f$.

The carbon dioxide gas at 6 atmospheres and accompanied by the residue of the steam, passes by a pipe 1 to a water-cooled cooler 2, wherein such residue of steam is condensed. The water of condensation escapes by a trap 3. The carbon dioxide gas passes by a pipe 4 into the first pre-cooler portion 5 of a refrigerator which jackets the evaporator $n$ of the absorption refrigerating machine. In the pre-cooler 5 the carbon dioxide is cooled to a temperature of $-15°$ C. to $-20°$ C. whereby any trace of humidity is frozen out of the carbon dioxide gas. The pre-cooler 5 may be duplicated, one being used to freeze-out the moisture whilst the frozen-out moisture in the other is thawing and being drained-off.

The carbon dioxide gas at 6 atmospheres absolute passes from the pre-cooler 5 into a portion 6 of the refrigerator wherein it is cooled to about $-53°$ C., which is the liquefaction point of carbon dioxide at 6 atmospheres absolute. The so-cooled carbon dioxide is admitted by cocks 7 into a series of ranges of moulds 8. These moulds 8 are cooled, by an evaporator chamber 9 of the absorption refrigerating machine, to $-60°$ C. or to a lower temperature.

The carbon dioxide still at the pressure of 6 atmospheres absolute, which is above the triple point, becomes solidified in the moulds 8, passing momentarily through the liquid state, whereby the freezing in the moulds occurs in stratified dense solid blocks.

As and when each mould 8 is estimated to be filled with a solid block of frozen carbon dioxide, the respective cock 7 is closed, and the pressure in the mould is allowed to diminish to 1 atmosphere absolute. About 5% of the carbon dioxide thereupon evaporates and reduces the temperature of the remainder to the freezing point of carbon dioxide at atmospheric pressure, viz. $-78.9°$ C.

The blocks of solid carbon dioxide or dry ice are extracted from the moulds and stored or delivered for sale.

Water is supplied to the various water-cooled portions of the plants and to the scrubber $d$ of each plant by pipes 10.

I claim:

1. A method of producing a dense block of solid carbon dioxide, consisting in absorbing carbondioxide in an absorption medium, driving off by heat said carbon dioxide and vaporized absorption medium from said absorption medium, utilizing the sensible heat of said driven-off carbon dioxide and the sensible and latent heat of said vaporized absorption medium as the prime mover of a refrigerating system, compressing said driven-off carbon dioxide to slightly above its triple point pressure, and cooling said compressed carbon dioxide by said refrigerating system to a solidifying temperature.

2. A method of producing a dense block of solid carbon dioxide, consisting in absorbing carbon dioxide in an absorption medium, driving off by heat said carbon dioxide at slightly above its triple point pressure and vaporized absorption medium from said absorption medium, utilizing the sensible heat of said driven-off carbon dioxide and the sensible and latent heat of said vaporized absorption medium as the prime mover of a refrigerating system, and cooling said compressed carbon dioxide by said refrigerating system to a solidifying temperature.

3. A method of producing solid carbon dioxide, consisting in absorbing carbon dioxide in an absorption medium, driving off by heat said carbon dioxide and vaporized absorption medium from said absorption medium, utilizing the sensible heat of said driven-off carbon dioxide and the sensible and latent heat of said vaporized absorption medium as the prime mover of a refrigerating system, compressing said carbon dioxide to slightly above its triple point pressure, cooling said compressed carbon dioxide by said refrigerating system to a liquefying temperature, and exposing said so-liquefied carbon dioxide to a lower pressure.

4. A method of producing a dense block of carbon dioxide ice in a mould, consisting in maintaining carbon dioxide gas at slightly above its triple point pressure in said mould, and cooling said carbon dioxide in said mould to a solidifying temperature.

5. A method of producing a dense block of carbon dioxide ice in a mould, consisting in compressing carbon dioxide gas to slightly above its triple point pressure, continuously admitting said carbon dioxide gas at said pressure into said mould, and cooling said carbon dioxide in said mould to a solidifying temperature.

GUIDO MAIURI.